United States Patent
Sharma et al.

(10) Patent No.: US 9,756,681 B2
(45) Date of Patent: Sep. 5, 2017

(54) SYSTEM AND METHOD FOR PROVIDING IP VERSION INTERWORKING FOR IMS ACCESS THROUGH EPC (71) Applicant: Mavenir Systems, Inc., Richardson, TX (US)

(72) Inventors: Anish Sharma, Richardson, TX (US); Mandeep Singh, Allen, TX (US)

(73) Assignee: MAVENIR SYSTEMS, INC., Richardson, TX (US)

( * ) Notice: Subject to any disclaimer, the term of this patent is extended or adjusted under 35 U.S.C. 154(b) by 0 days.

(21) Appl. No.: 14/465,303

(22) Filed: Aug. 21, 2014

(65) Prior Publication Data

US 2016/0057788 A1 Feb. 25, 2016

(51) Int. Cl.
*H04W 80/04* (2009.01)
*H04L 29/12* (2006.01)
(Continued)

(52) U.S. Cl.
CPC ......... *H04W 80/045* (2013.01); *H04L 61/251* (2013.01); *H04L 61/2585* (2013.01); *H04M 15/57* (2013.01); *H04M 15/66* (2013.01); *H04M 15/8214* (2013.01); *H04L 12/1407* (2013.01); *H04L 12/1467* (2013.01); *H04L 41/0893* (2013.01); *H04L 41/5019* (2013.01); *H04L 41/5054* (2013.01); *H04L 45/741* (2013.01); *H04L 61/2015* (2013.01);
(Continued)

(58) Field of Classification Search
CPC ... H04L 12/4633; H04L 45/741; H04L 47/20; H04L 61/2503; H04L 61/2507; H04L 61/251; H04L 12/1407; H04L 12/1467; H04L 41/0893; H04L 41/5019; H04L 41/5054; H04L 61/2015; H04L 61/2585; H04L 61/6059; H04M 15/66; H04M 15/57; H04M 15/8214; H04W 36/0022; H04W 76/021; H04W 76/022; H04W 80/045; H04W 88/16; H04W 92/24
See application file for complete search history.

(56) References Cited

U.S. PATENT DOCUMENTS

8,270,978 B1 * 9/2012 Faccin ............ H04W 36/0016
 370/331
9,258,755 B1 * 2/2016 Ramamurthy ........ H04W 36/14
(Continued)

*Primary Examiner* — Khoa Huynh
(74) *Attorney, Agent, or Firm* — Ohlandt, Greeley, Ruggiero & Perle, L.L.P.

(57) ABSTRACT

A Packet Data Network Gateway (PGW) network node of an Evolved Packet Core (EPC) for interfacing with an IP Multimedia Core Network Subsystem (IMS) comprises an IP address assignment functionality module configured to assign both IPv4 and IPv6 addresses to a User Equipment (UE) requesting an IPv6 address, a Network Address Translation-Application Layer Gateway (NAT64-ALG) functionality module and PGW configured to translate between IPv4 and IPv6 addresses, a Gx interface toward a Policy Control and Charging Rules Function (PCRF) network node configured to transmit the UE's IPv4 address to the PCRF, and an SGi interface toward an application node of the IMS configured the UE's IPv4 address to the application node, and to transmit and receive IP media packets between the IMS and the UE after IPv4 and IPv6 address translation.

19 Claims, 7 Drawing Sheets (51) Int. Cl.
*H04M 15/00* (2006.01)
*H04W 88/16* (2009.01)
*H04L 12/749* (2013.01)
*H04W 92/24* (2009.01)
*H04L 12/24* (2006.01)
*H04L 12/14* (2006.01)

(52) U.S. Cl.
CPC ......... *H04L 61/6059* (2013.01); *H04W 88/16* (2013.01); *H04W 92/24* (2013.01)

(56) References Cited

U.S. PATENT DOCUMENTS

| | | | | |
|---|---|---|---|---|
| 2005/0243840 | A1* | 11/2005 | Sivalingam | H04L 12/4633 370/401 |
| 2007/0253405 | A1* | 11/2007 | Willis | H04W 76/021 370/352 |
| 2013/0107888 | A1* | 5/2013 | Guo | H04W 36/0022 370/401 |
| 2014/0317269 | A1* | 10/2014 | Munoz de la Torre Alonso | H04L 47/20 709/224 |

* cited by examiner

SYSTEM AND METHOD FOR PROVIDING IP VERSION INTERWORKING FOR IMS ACCESS THROUGH EPC

FIELD

The present disclosure relates to the field of telecommunications, and in particular this disclosure relates to a system and method for IPv6 and IPv4 Mapping in the Packet Data Network (PDN) Gateway (PGW).

BACKGROUND

The Third Generation Partnership Project (3GPP) unites six telecommunications standards bodies, known as "Organizational Partners," and provides their members with a stable environment to produce the highly successful Reports and Specifications that define 3GPP technologies. A mobile device, also called a User Equipment (UE), may operate in a wireless communication network that provides high-speed data and/or voice communications. The wireless communication networks may implement circuit-switched (CS) and/or packet-switched (PS) communication protocols to provide various services. For example, the UE may operate in accordance with one or more of an Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA: includes Wideband-CDMA (W-CDMA) and Low Chip Rate (LCR) cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long-Term Evolution (LTE) is a new release of UMTS that uses E-UTRA. UTRA, E-UTRA, GSM, UMTS and LTE are described in specification documents from an organization named "3rd Generation Partnership Project" (3GPP). These various radio technologies and standards are known in the art.

The Evolved Packet Core (EPC) is the latest evolution of the 3GPP core network architecture first introduced in Release 8 of the standard. In EPC, the user data and the signaling data are separated into the user plane and the control plane. The EPC is composed of four basic network elements: the Serving Gateway (SGW), the Packet Data Network Gateway (PDN GW or PGW), the Mobility Management Entity (MME), and the Home Subscriber Server (HSS). The EPC is connected to external networks, which can include the IP Multimedia Core Network Subsystem (IMS).

Internet Protocol version 6 (IPv6) is the latest version of the Internet Protocol (IP), the communications protocol that provides an identification and location system for computers on networks and routes traffic across the Internet. IPv6 was developed by the Internet Engineering Task Force (IETF) to deal with the long-anticipated problem of IPv4 address exhaustion due to a rapid expansion of IP-connectivity in a wide range of consumer devices, appliances, toys, and other devices. IPv6 is intended to replace IPv4, which currently still carries more than 96% of Internet traffic worldwide. IPv6 uses a 128-bit address, allowing $2^{128}$, or approximately $3.4 \times 10^{38}$ addresses, or more than $7.9 \times 10^{28}$ times as many as IPv4, which uses 32-bit addresses and provides approximately 4.3 billion addresses.

The two protocols are not designed to be interoperable, which complicates the transition to IPv6. Until IPv6 completely replaces IPv4, a mapping or translation between the IPv6 and IPv4 addresses is required to enable IPv6-only clients to reach IPv4 networks and services. The coexistence of IPv4 and IPv6 is likely to continue for many years to come.

DETAILED DESCRIPTION

Figure 1:
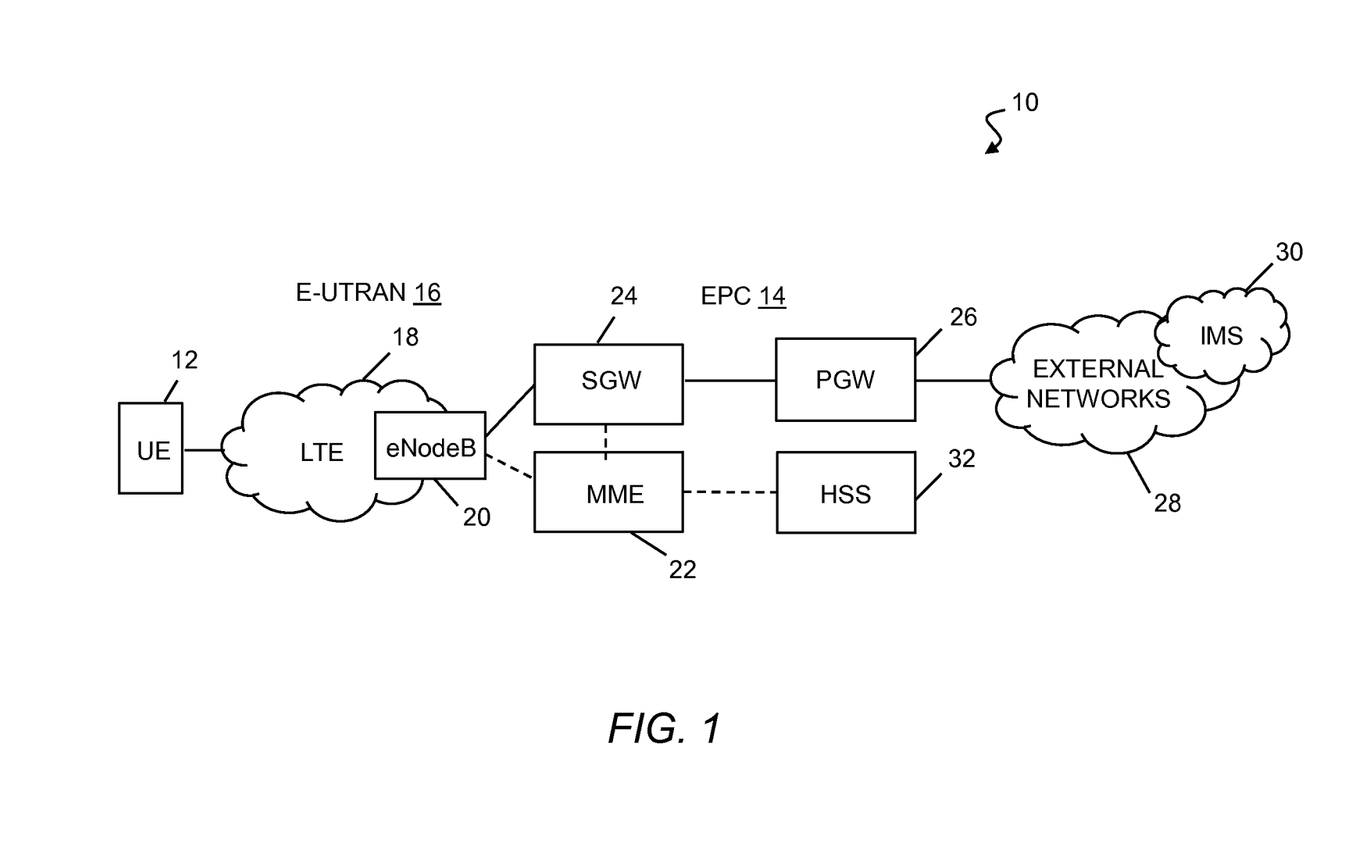
FIG. 1 is a simplified block diagram of an exemplary Evolved Packet System (EPS) network architecture according to the present disclosure.

FIG. 1 is a simplified diagram illustrating an Evolved Packet System (EPS) 10. The EPS 10 may include one or more user equipment (UE) 12 accessing the Evolved Packet Core (EPC) 14 over an Evolved UMTS Terrestrial Radio Access Network (E-UTRAN) 16, an access network in LTE (Long Term Evolution) 18. The E-UTRAN 16 includes at least one evolved Node B (eNodeB) transceiver 20. The eNodeB 20 provides user plane and control plane protocol termination toward the UE 12. The eNodeB 20 may be connected to other eNodeBs via a backhaul (e.g., an X2 interface; not shown).

The eNodeB 20 are also commonly referred to as a base station, a base transceiver station, a radio base station, a radio transceiver, a transceiver function, a basic service set (BSS), and an extended service set (ESS). The eNodeB 20 provides an access point to the EPC 14 for a UE 12. Examples of a UE 12 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 12 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 20 is connected by an S1 interface to the EPC 14. The EPC 14 includes a Mobility Management Entity (MME) 22, other MMEs, a Serving Gateway (SGW) 24, and a Packet Data Network (PDN) Gateway (PGW) 26. The MME 22 is a node in the control plane that processes the signaling related to mobility and security between the UE 12 and the EPC 14. Generally, the MME 22 provides bearer and connection management. The gateway nodes 24 and 26 are in the user plane, and transport IP data traffic between the UE 12 and the external networks 28. All user IP packets are transferred through the SGW 24 and the PGW 26. The SGW 24 is the connection point between the radio-side and the EPC 14, and routes and forwards user IP data packets while also acting as the mobility anchor for the user plane during inter-eNodeB handovers, and as the anchor for mobility between LTE and other 3GPP technologies.

The PGW 26 is the connection point between the EPC 14 and the external packet data networks 28, and provides IP address allocation as well as other functions for the UE 12. The PGW 26 is the point of exit and entry of data traffic for the UE 12. The PGW 26 is connected to external networks 28 that may include, for example, the Internet, the Intranet, an IP Multimedia Subsystem (IMS) 30, and a PS Streaming Service (PSS). A UE 12 may have simultaneous connectivity with more than one PGW for accessing multiple Packet Data Networks (PDN). The PGW 26 performs functions such as UE IP address allocation, policy enforcement, packet filtering for each user, charging support, lawful interception, and packet screening. The EPC 14 further includes the Home Subscriber Server (HSS) 32, which is primarily a database that contains user-related and subscriber-related information. It also provides support functions in mobility management, call and session setup, user authentication, and access authorization.

It should be noted that the radio access network may communicate with the EPC 14 via one or a combination of gateway nodes, including the PGW, SWG, and a HRPD serving gateway (HSGW).

Although the UE 12 can reach the EPC 14 using E-UTRAN 16, other access technologies are also specified by 3GPP. Existing 3GPP radio access networks are supported. 3GPP specifications define how the interworking is achieved between an E-UTRAN (LTE and LTE-Advanced), GERAN (radio access network of GSM/GPRS) and UTRAN (radio access network of UMTS-based technologies WCDMA and HSPA). The EPS 10 also allows non-3GPP technologies to interconnect the UE 12 and the EPC 14. The term "non-3GPP" means that these access technologies were not specified in the 3GPP. These include, e.g., WiMAX, cdma2000, WLAN and fixed networks. Non-3GPP access technologies can be further classified as "trusted" and "untrusted" access networks. Trusted non-3GPP accesses can interface directly with the EPC 14. However, untrusted non-3GPP accesses interwork with the EPC 14 via a network entity called the ePDG (Evolved Packet Data Gateway). The main role of the ePDG is to provide security mechanisms such as IP Security (IPsec) tunneling of connections with the UE 12 over an untrusted non-3GPP network access, such as WLAN technology.

Figure 2:
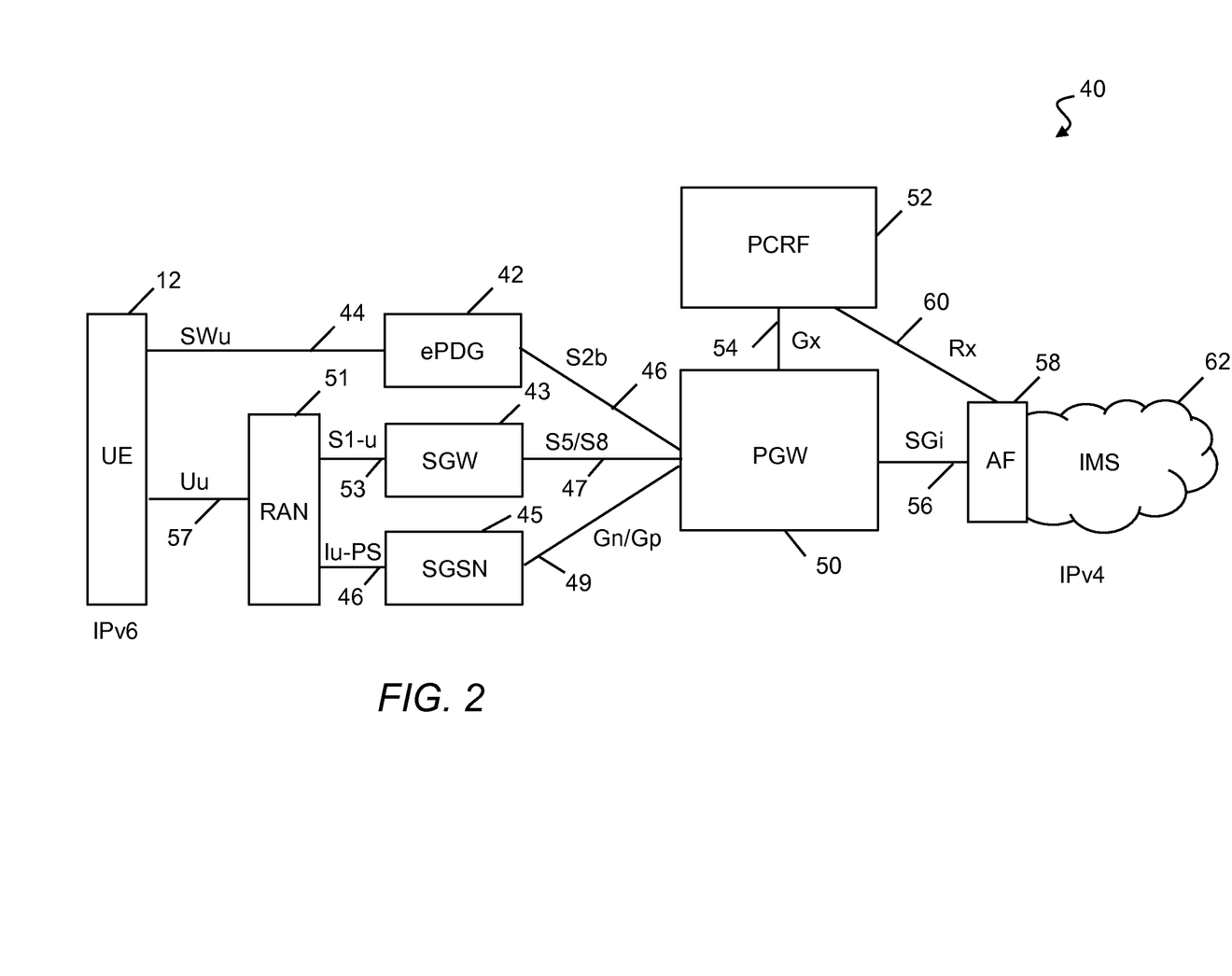
FIG. 2 is a simplified block diagram of network nodes in an EPC including a Packet Data Network Gateway (PGW) to provide access to a UE over an untrusted non-3GPP access network.

FIG. 2 is a simplified block diagram of network nodes in an EPC 40 including an ePDG 42 to provide access to a UE 12 over an untrusted non-3GPP access network. The ePDG 42 is configured to implement secure data connections between the UE 12 and the EPC 40. The ePDG 42 provides an SWu interface 44 and acts as a termination node of IPSec (encrypted) tunnels at the SWu interface 44 established with the UE 12. The IPSec tunnels are used to perform secure transfer of authentication information and subscriber data over the untrusted interfaces and backhauls. The IPSec protocol suite uses cryptographic security services to protect communications over IP networks. The IPSec protocol suite supports network-level peer authentication, data origin authentication, data integrity, data confidentiality (encryption), and replay protection. The ePDG 42 is configured to implement the S2b interface 46 with either GPRS Tunneling Protocol (GTP) or Proxy Mobile IPv6 (PMIPv6) for the control plane and user plane, respectively, toward the PGW 50.

Instead of or in addition to the ePDG 42, the PGW 50 can be coupled to an SGW 43 over an S5/S8 interface 47, and/or an Serving GPRS Support Node (SGSN) 45 over a Gn/Gp interface 49. The SGW 43 is coupled to a Radio Access Network (RAN) 51 via an S1-u interface 53. The SGSN 45 is coupled to the RAN 51 via an Iu-PS interface 55. The RAN 51 is coupled to the UE 12 via the air interface Uu 57.

The GPRS Tunneling Protocol (GTP) is a group of IP-based communication protocols used to carry General Packet Radio Service within GSM, UMTS and LTE networks. In 3GPP architectures, GTP and Proxy Mobile IPv6-based (PMIPv6) interfaces are specified on various interface points. GTP can be decomposed into separate control and user plane protocols, GTP-C and GTP-U. GTP-C is used within the packet core network for signaling between gateways to activate a session on a user's behalf (e.g., PDP context activation), to deactivate the same session, to adjust quality of service parameters, or to update a session for a subscriber who has just arrived from another Serving GPRS Support Node (SGSN). GTP-U is used for carrying user data within the packet core network and between the radio access network and the core network. The user data transported can be packets in any of IPv4, IPv6, or PPP formats. The GTP-U protocol is used over S1-U, X2, S4, S5, S8, S12, and S2b interfaces of the EPS. For some of the GTP-based interfaces (e.g., S5, S8, or S2b) between the gateways in the EPS network, an alternative option is to use PMIPv6. The user plane for PMIPv6-based interface uses the GRE encapsulation for transporting user data.

The PGW 50 may include one or more data transfer devices (or network devices), such as a gateway, a router, a switch, a firewall, a network interface controller, a hub, a bridge, a proxy server, an optical add-drop multiplexer, or some other type of device that processes and/or transfers data. The PGW 50 may provide connectivity of the UE to external PDNs by being a traffic exit/entry point for the UE. The UE may simultaneously connect to more than one PGW for accessing multiple PDNs. The PGW 50 may also act as an anchor for mobility between 3GPP and non-3GPP technologies.

The PGW 50 includes a Policy and Charging Enforcement Function (PCEF) that encompasses policy enforcement and flow-based charging functionalities. The PGW 50 provides control over the user plane traffic handling and its QoS, and provides service data flow detection and counting as well as online and offline charging interactions. For a service data flow that is under policy control, the PCEF allows the service data flow to pass through the PGW if the corresponding gate is open. For a service data flow that is under charging control, the PCEF allows the service data flow to pass through the PGW if there is a corresponding active Policy and Charging Control (PCC) rule and, for online charging, the online charging system has authorized the applicable credit with that Charging Key (Rule Base). The PCEF may let a service data flow pass through the PGW during the course of the credit re-authorization procedure.

The PGW 50 is coupled to a Policy Charging and Rule Function (PCRF) 52 via a Gx interface 54. The PCRF is the central entity that makes policy and charging decisions based on input from different sources, including mobile operator configuration, user subscription information, services information, etc. The policy and charging decisions are then communicated to the Policy and Charging Enforcement Function (PCEF) or PGW in the form of PCC rules, which contain Service Data Flow (SDF) information that allows identification of IP traffic, charging parameters that are used to charge this traffic, and quality-of-service (QoS) parameters to be applied to the IP traffic that the SDF filters identify. The Gx reference point is used for provisioning of PCC rules from the PCRF 52 to the PGW 50 and the transmission of traffic plane events from the PGW 50 to the PCRF 52. A PCC rule may include the rule name, a service identifier, service data flow (SDF) filters, gate status, Quality of Service (QoS) parameters, charging key, monitoring key, and other parameters. The PGW 50 also has an SGi interface 56 to a Packet Data Network (PDN) including an interface node called an Application Function (AF) 58 that does not support IPv6 in this example. In some networks, the AF is embodied as a Session Border Controller (SBC). The AF 58 offers applications that require the control of EPS bearer resources, and communicates with the PCRF 52 to transfer dynamic service information. An Rx reference point 60 is located between the PCRF 52 and the AF interface 58 in the IMS 62. The Rx interface 60 is used to exchange application level session information between the PCRF 52 and AF 58.

As shown in FIG. 2, the UE 12 is an IPv6-only clients, mobile handset, or mobile station. It is only capable of activating IPv6 Packet Data Protocol (PDP) contexts. IPv6 networks are deployed both by migrating existing IPv4 networks to IPv6 and by building native IPv6 networks. Network planners need to include mechanisms for local coexistence between IPv6 and IPv4 infrastructures, in addition to the continued interworking of both protocols with the rest of the Internet—including new IPv6-only networks. Therefore, a mis-match in the address space of the UE 12 and IMS 62 exists and must be addressed. NAT64 Domain Name System (DNS) 64 is one mechanism that allows IPv6-only clients to communicate with IPv4-only hosts using address and protocol translation. Existing solutions require modifications to be made in the PCRF and/or AF in order to implement mapping between the two protocols. The present disclosure describes a system and method of performing such translation or mapping within the PGW functionality without modifying the PCRF or AF.

Figure 3:
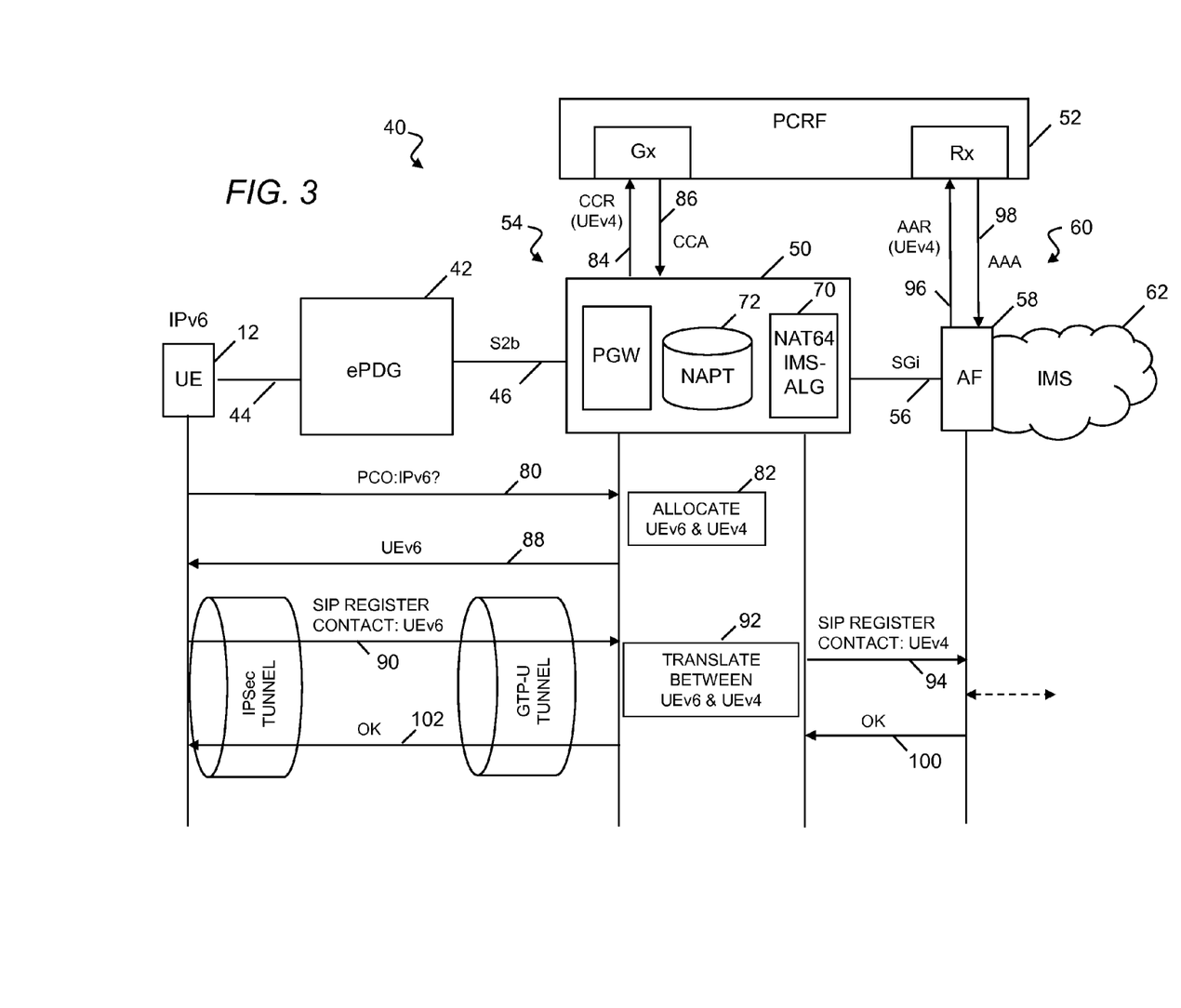
FIG. 3 is a simplified block diagram and flow diagram of a first exemplary process performed by the PGW with co-located NAT64 functionality configured to provide access to a UE over an untrusted non-3GPP access network according to the present disclosure.

FIG. 3 is a more detailed block and message flow diagram of an exemplary embodiment of a system and method for IPv6 and IPv4 Mapping in the PGW according to the present disclosure. As shown in FIG. 2, the IPv6 UE 12 is coupled to the ePDG 42 via the SWu interface 44 using the IPSec protocol to establish secure data transmission. The ePDG 42 is coupled to the PGW 50 via a S2b interface 46 transporting user plane data via, for example, a GTP-U tunnel. The PGW 50 encompasses the NAT64 Domain Name System (DNS) 64 Application-Level Gateway (ALG) translation functionality 70 with access to a Network Address and Port Translation (NAPT) table or database 72. The PGW 50 establishes Gx sessions with the PCRF 52 to provision policy charging and control rules, and the AF establishes Rx sessions with the PCRF 52 to exchange application level session information.

Referring to the message flows illustrated in FIG. 3, the IPv6 UE 12 initiates the Attach procedure by the transmission, to the eNodeB, of an Attach Request. The UE network capabilities indicate the supported NAS and AS security algorithms, and the PDN type indicates the requested IP version (IPv6). The Protocol Configuration Options (PCO) message 80 is used to transfer parameters including the IP version between the UE 12 and the PGW 50. The PCO 80 may include an indication that the UE 12 prefers to obtain an IPv6 address. At the PGW 50, both IPv4 and IPv6 addresses are allocated to the UE 12, step 82. The PGW supports dynamic IP address assignment to subscriber IP PDN contexts using the Dynamic Host Control Protocol (DHCP). The PGW includes local IPv4/IPPv6 address pools for assigning IP addresses to UEs on a per-PDN basis. The PGW 50 then initiates a Gx session with the PCRF 52 to request and provision PCC rules. A Credit Control Request (CCR) message 84 is sent by the PGW 50 to the PCRF 52 that includes the allocated IPv4 address for the UE 12 or UEv4. Other message parameters may include the International Mobile Subscriber Identity (IMSI) and Mobile Subscriber ISDN Number (MSISDN) of the UE 12. The PCRF 52 in response replies with a Credit Control Answer (CCA) message 86 that includes PCC rules.

The PCC rules may contain Service Data Flow (SDF) information that allows identification of IP traffic, charging parameters that are used to charge this traffic, and quality-of-service (QoS) parameters to be applied to the IP traffic that the SDF filters identify. SDF filters (flow identifiers) are configured in the PCC rules to classify IP packets to a Service Data Flow. SDF filters in the PCC rules enforce transport of uplink and downlink IP flows in the appropriate EPS bearer. If an IP packet matches the SDF filter, and the gate of the corresponding rule is open, the packet is forwarded to its destination. In this example shown in FIG. 3, the PCRF 52 did not provide any filters to the PGW 50. The PGW 50 proceeds to reply to the UE with the UEv6 address allocated to it (88).

The UE 12 sends an SIP Register message 90 that includes the IPv6 address allocated to it. The NAT64 ALG (Application Layer Gateway) functionality 70 in the PGW 50 performs translation of the UE's IPv6 address to the IPv4 address 92, and an SIP Register message 94, now with the IPv4 address, is passed on to the AF 58. The AF 58 initiates an Rx session with the PCRF 52 by sending a Diameter Authentication Authorization Request (AAR) message 96 with the UE's IPv4 address to the PCRF 52 over the Rx interface. The AAR message 96 may include the IMSI and Mobile Station International Subscriber Directory Number (MSISDN) of the UE 12. The PCRF responds with a Diameter Authentication Authorization Answer (AAA) message 98. Upon receiving the AAA message 98, the AF 58 replies to the PGW 50 with a 200 OK message 100. The PGW 50 in turn responds to the UE with a 200 OK message 102.

Figure 4:
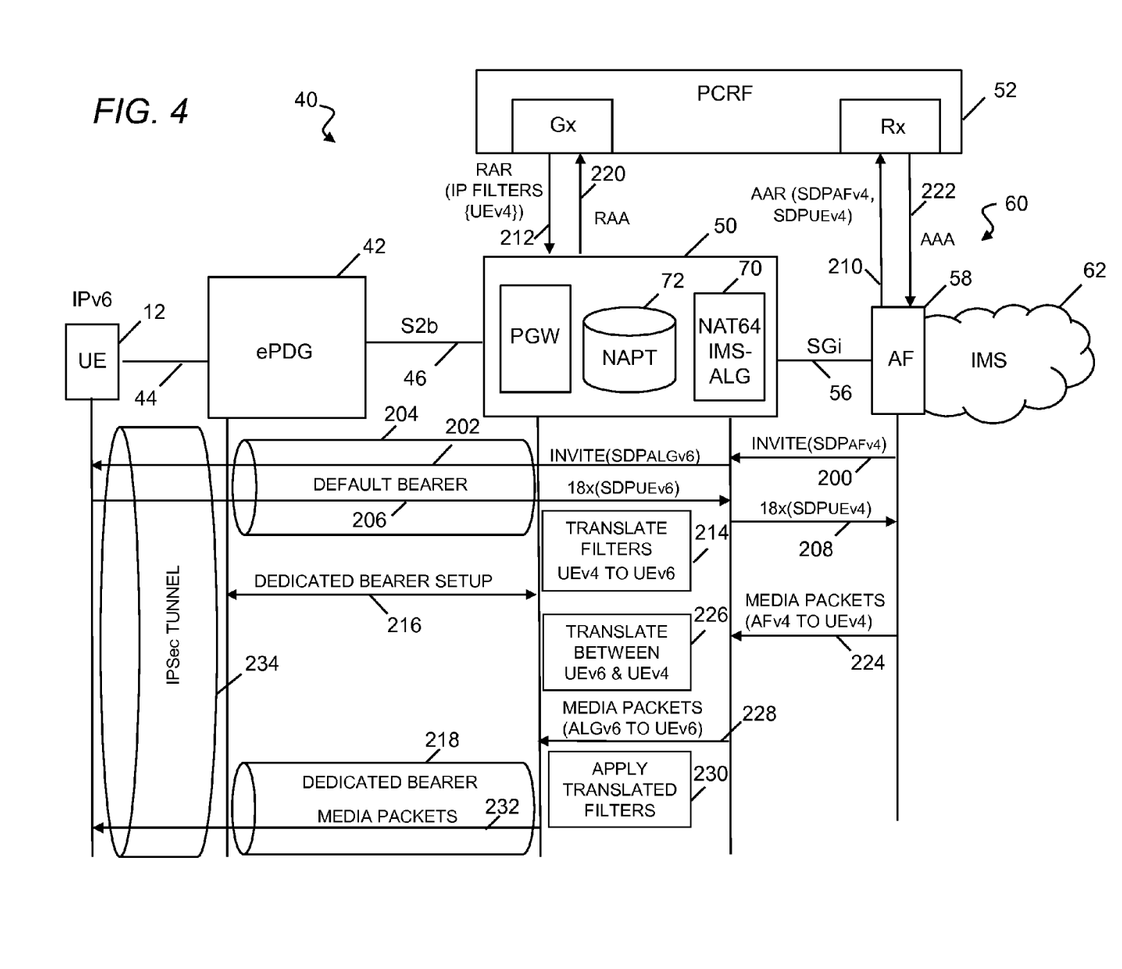
FIG. 4 is a more detailed block and flow diagram of a second exemplary process performed by the PGW with co-located NAT64 functionality configured to provide access to a UE over an untrusted non-3GPP access network according to the present disclosure.

FIG. 4 is another simplified block and message flow diagram showing an exemplary process according to the present disclosure. An Session Initiation Protocol (SIP) invite message that includes Session Description Protocol (SDP) offer information, INVITE (SDP$_{AFv4}$) 200, which includes the SDP answer information containing the IPv4 address of the AF, is sent from the AF 58 to the PGW 50 over the SGi interface. SIP is an application-layer protocol for establishing, terminating, and modifying multimedia sessions. SDP is a protocol that is intended to be used to describe a multimedia communication session for the purposes of session announcement, session invitation, and parameter negotiation. The SDP invite message 200 is received by the PGW 50 and is translated by its NAT64 functionality 70 to an SDP invite message that includes an IPv6 address, INVITE (SDP$_{ALGv6}$) 202, which includes the SDP answer information that contains the IPv6 address of the ALG, and transmitted to the UE 12 via the ePDG 42 and a default EPS bearer 204 assigned to the UE 12 that is attached to the network. The default bearer represents a set of network parameters that define how the data will be treated in terms of bit rate, QoS, etc. The default bearer has an associated IP address. The UE 12 responds by sending an SIP 18x provisional response message, 18x (SDP$_{UEv6}$) 206, which includes the SDP answer information containing the IPv6 address allocated to the UE, to the PGW 50. The PGW 50 again translates the IPv6 address to the IPv4 address and transmits the 18x message, 18x (SDP$_{UEv4}$) 208, which includes the SDP answer information containing the IPv4 address allocated to the UE, to the AF 58 over the SGi interface.

In response to the 18x message 208, the AF 58 initiates an Rx session with the PCRF 52 by sending an AA Request (AAR) message (SDP$_{AFv4}$, SDP$_{UEv4}$) 210 that includes the SDP information containing the IPv4 address of the AF and allocated to the UE. The AAR message 210 includes the characteristics of the media negotiated in the SDP information. The AAR message 210 may include session, media, and subscriber related information. In response to receiving the AAR message 210 at the Rx interface, the PCRF 52 sends a Re-Authenticate Request (RAR) message 212 that includes the Service Data Flow (SDF) or IP filters based on the IPv4 address received from the AF to the PGW 50 via the Gx interface. The RAR message 212 may include the rule name, filters, gate status, QoS parameters, charging keys, monitoring keys, etc. The PGW 50 executes the PCC rules and translates the received IP filters from IPv4 to IPv6, in step 214. In step 216, the PGW 50 proceeds to set up a dedicated EPS bearer 218 with the ePDG 42. The dedicated bearer provides a dedicated tunnel with a guaranteed bit rate for the UE's media packet traffic that is in addition to the default bearer 204, while the default bearer is used for signaling messages related to the IMS network. The PGW 50 also returns a Re-Authentication Answer (RAA) message 220 to the PCRF 52. The RAA message 220 may include IP CAN bearer attributes, request type, and subscriber related information. The PCRF 52 then sends an Authentication Authorization Answer (AAA) message 222 to the AF 58.

The AF 58 may now forward media packets to the PGW 50 (224) using the IPv4 address and the dedicated bearer 218. The NAT64 ALG function 70 of the PGW 50 performs translation between IPv4 and IPv6, including the IP version interworking within SIP messages, in step 226, and the translated filters are applied to process the media packets 228 translated to IPv6, in step 230. If PCC is enabled, the PCEF in the PGW 50 selects the applicable PCC rule for each received uplink IP packet within an IP CAN bearer by evaluating the packet against the SDF filters specified in the PCC rules. The media packets are then transmitted to the ePDG 42 on the dedicated bearer 218 according to the SDF filters, in step 232. The media packets are further transmitted over the IPSec tunnel 234 to the UE 12.

Figure 5:
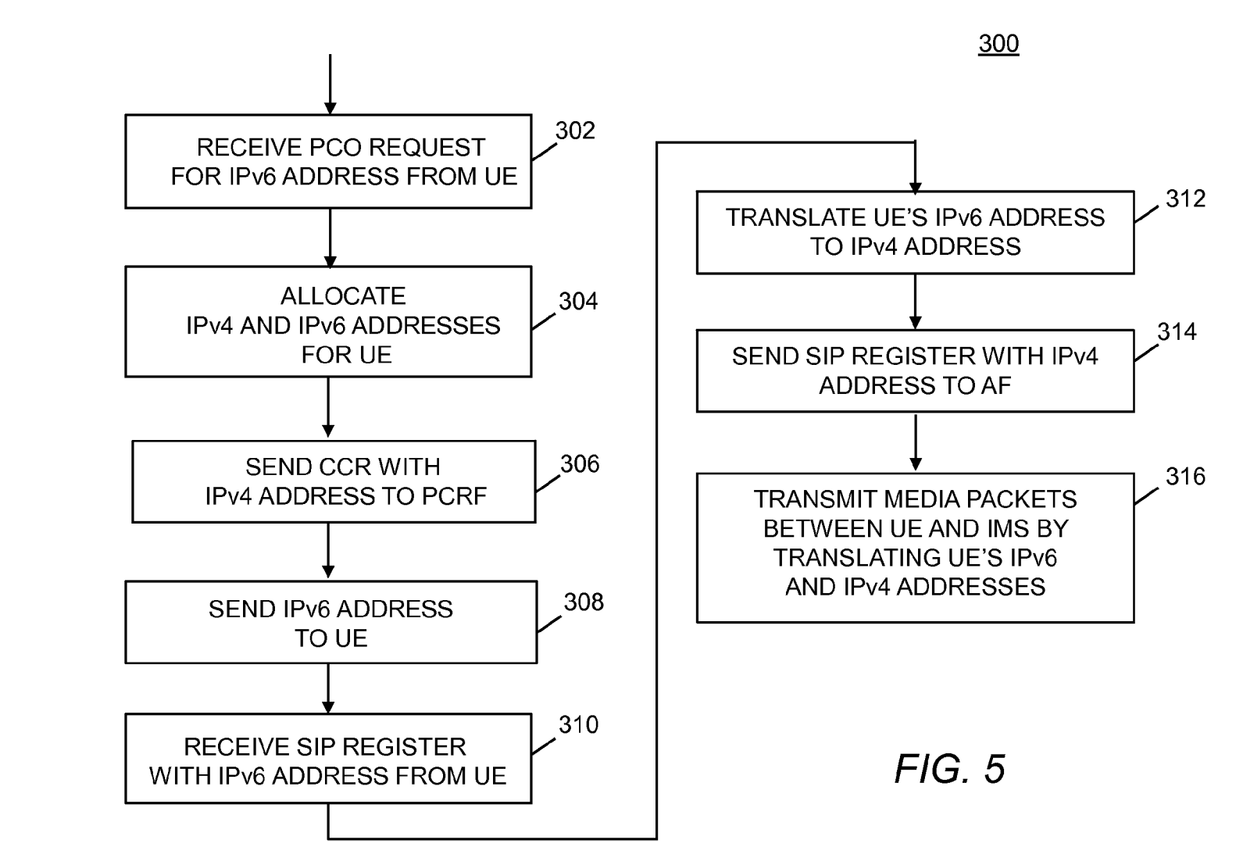
FIG. 5 is a flowchart of the first exemplary process performed by the PGW with co-located NAT64 functionality configured to provide access to a UE over an untrusted non-3GPP access network according to the present disclosure.

FIG. 5 is a flowchart of the first exemplary process 300 performed by the PGW with co-located NAT64 functionality configured to provide access to a UE over an untrusted non-3GPP access network according to the present disclosure. In block 302, the PGW 50 receives a Protocol Configuration Options (PCO) message from the UE that includes an indication that the UE prefers to obtain an IPv6 address. At the PGW 50, both IPv4 and IPv6 addresses are allocated to the UE, in block 304. The PGW includes local IPv4/IPPv6 address pools for assigning IP addresses to UEs on a per-PDN basis. The PGW 50 then initiates a Gx session with the PCRF 52 to request and provision PCC rules. In block 306, a Credit Control Request (CCR) message is sent by the PGW 50 to the PCRF 52 that includes the allocated IPv4 address for the UE 12 or UEv4. Other CCR message parameters may include the International Mobile Subscriber Identity (IMSI) and Mobile Subscriber ISDN Number (MSISDN) of the UE. The PCRF 52 in response replies with a Credit Control Answer (CCA) message. The PGW 50 proceeds to reply to the UE with the IPv6 or UEv6 address allocated to it, in block 308.

The PGW receives, from the UE, an SIP Register message that includes the IPv6 address allocated to it, in block 310. In block 312, the NAT64 ALG (Application Layer Gateway) functionality in the PGW 50 performs translation of the UE's IPv6 address to the IPv4 address, and an SIP Register message 94, now with the IPv4 address, is passed on to the AF. In response, the AF initiates an Rx session with the PCRF 52 by sending a Diameter Authentication Authorization Request (AAR) message with the UE's IPv4 address to the PCRF 52 over the Rx interface. The AAR message may include the IMSI and MSISDN of the UE. The PCRF responds with a Diameter Authentication Authorization Answer (AAA) message. This results in the ability for the PGW to transmit media packets between the UE and the IMS and perform address translation therebetween.

Figure 6:
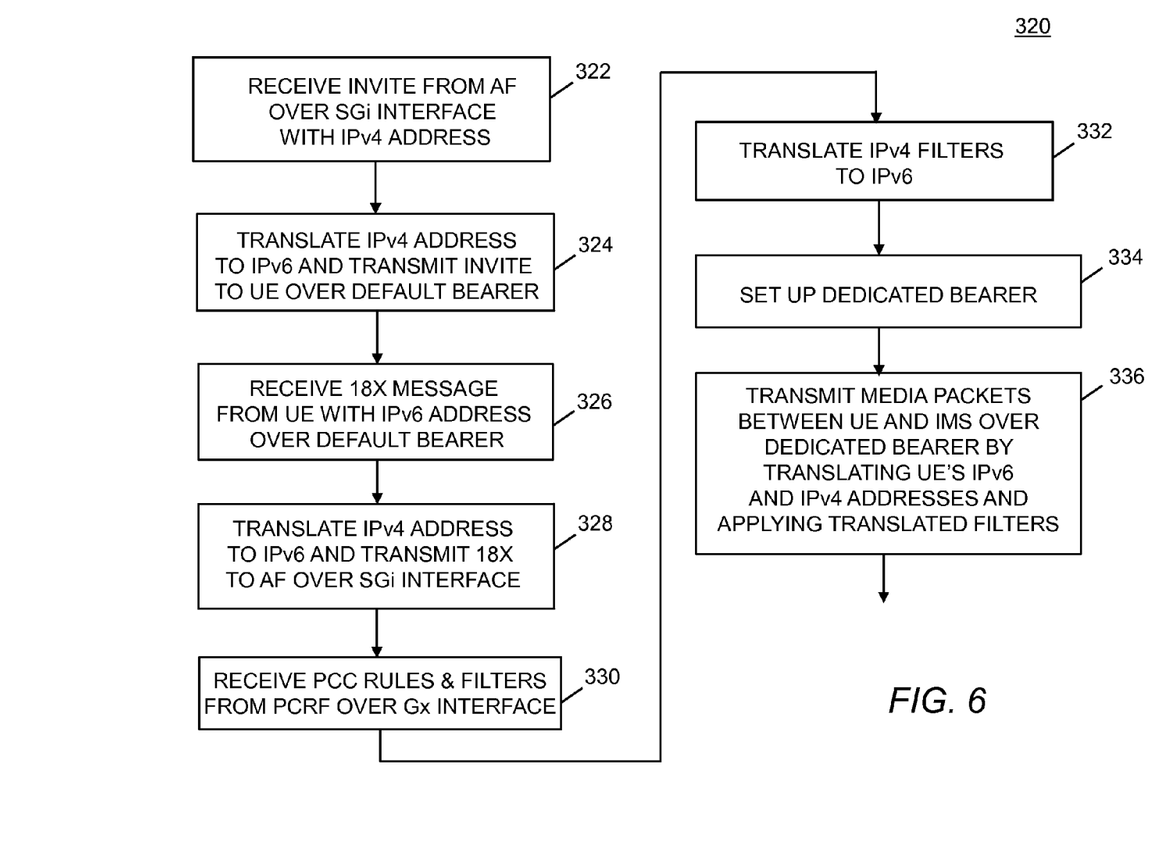
FIG. 6 is a simplified flowchart of the second exemplary process performed by the PGW with co-located NAT64 functionality configured to provide access to a UE over an untrusted non-3GPP access network according to the present disclosure.

FIG. 6 is a simplified flowchart of the second exemplary process 320 performed by the PGW with co-located NAT64 functionality configured to provide access to a UE over an untrusted non-3GPP access network according to the present disclosure. In block 322, the PGW receives an Session Initiation Protocol (SIP) invite message that includes Session Description Protocol (SDP) offer information, INVITE (SDP$_{AFv4}$), from the AF over the SGi interface. The Invite message includes an IPv4 address of the AF. In block 324, the SDP invite message is received by the PGW 50 and is translated by its NAT64 functionality module to an SDP invite message that includes the IPv6 address of the ALG, INVITE (SDP$_{ALGv6}$), and transmitted to the UE via a default EPS bearer assigned to the UE. In block 326, the PGW receives an SIP 18x provisional response message, 18x (SDP$_{UEv6}$), from the UE that includes the SDP answer information containing the IPv6 address allocated to the UE. In block 328, the PGW 50 again translates the IPv6 address to the IPv4 address and transmits the 18x message, 18x (SDP$_{UEv4}$), the SDP message that contains the IPv4 address allocated to the UE, to the AF over the SGi interface.

In response to the 18x message 208, the AF 58 initiates an Rx session with the PCRF 52 by sending an AA Request (AAR) message (SDP$_{AFv4}$, SDP$_{UEv4}$) that includes the SDP containing the IPv4 address of the AF and the IPv4 address allocated to the UE. The AAR message includes the characteristics of the media negotiated in the SDP information. The AAR message may include session, media, and subscriber related information. In response to receiving the AAR message at the Rx interface, the PCRF 52 sends a Re-Authenticate Request (RAR) message that includes the Service Data Flow (SDF) or IP filter rules to the PGW 50 via the Gx interface, in block 330. The RAR message may include the rule name, filters, gate status, QoS parameters, charging keys, monitoring keys, etc. The PGW 50 executes the PCC rules and translates the received IP filters from IPv4 to IPv6, in block 332. In block 334, the PGW 50 proceeds to set up a dedicated EPS bearer with the ePDG. The dedicated bearer provides a dedicated tunnel with a guaranteed bit rate for the UE's media packet traffic that is in addition to the default bearer, while the default bearer is used for signaling messages related to the IMS network. The PGW 50 also returns a Re-Authentication Answer (RAA) message to the PCRF 52. The RAA message may include IP CAN bearer attributes, request type, and subscriber related information. The PCRF 52 then sends an Authentication Authorization Answer (AAA) message to the AF.

In block 336, the AF may now forward media packets to the PGW 50 using the IPv4 address and the dedicated bearer. The NAT64 ALG functionality module of the PGW 50 performs translation between IPv4 and IPv6, and the translated filters are applied to process the media packets translated to IPv6. In particular, the IP version translation is limited to the IP header and replacing IPv4 with IPv6 addresses with the SIP message. The translation of IP filters is done by the PGW with help from the NAT64 ALG function. If PCC is enabled, the PCEF in the PGW 50 selects the applicable PCC rule for each received uplink IP packet within an IP CAN bearer by evaluating the packet against the SDF filters specified in the PCC rules. The media packets are then transmitted to the ePDG on the dedicated bearer according to the SDF filters. The media packets are further transmitted over the IPSec tunnel to the UE.

By incorporating the IPv4 and IPv6 mapping or translation process in the PGW, no other network node or functionality need to be modified to accommodate an IPv6 UE accessing IPv6 resources or networks across existing IPv4 infrastructure. The PGW assigns both IPv4 and IPv6 addresses to the UE, but interfaces with the PCRF and the AF using only the UE's IPv4 address. The PGW takes care of address and filter translation so that the AF, IMS, and PCRF are not aware that it is dealing with a UE with an IPv6 address.

In this disclosure, the term "module," "node," and "function" may be used to refer a physical circuit or collection of hardware components, a processor-based system, a logical code module, functionality, and/or a combination of hardware and software entities. The processes described herein may be generally implemented by executing specialized software code on one or more microprocessors with the attendant memory, input/output ports, busses, logic circuits, and other peripheral hardware circuits and devices.

It should be noted the present disclosure contemplates that in some implementations the ePDG and the PGW may be co-located or integrated with one another in the same "box," chassis, or node. However, the PGW functionality is still the primary logic or module responsible for the IPv4 and IPv6 mapping or translation process described herein.

Figure 7:
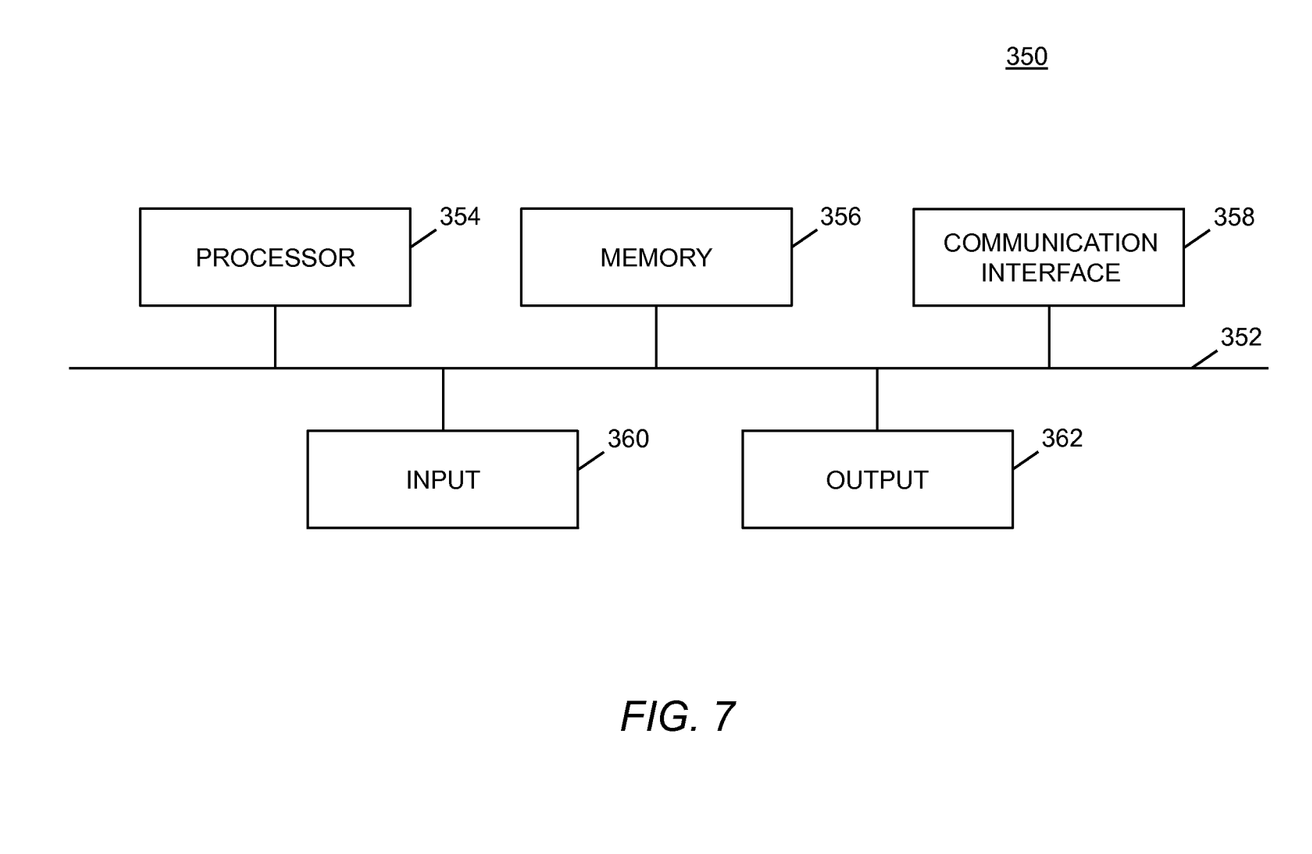
FIG. 7 is a simplified block diagram of an exemplary embodiment of a network node of an Evolved Packet System (EPS) according to the present disclosure.

FIG. 7 is a simplified block diagram of an exemplary embodiment of a network node of the Evolved Packet System (EPS) 10. As illustrated, network node 350 may include a bus 352 interconnecting a processor 354, a memory 356, a communication interface 358, an input device 360, and an output device 362. The bus 352 enables communication among the components of network node 350. The processor 354 may include one or more processing units or microprocessors that interpret and execute coded instructions. In other implementations, the processor 354 may be implemented by or include one or more application-specific integrated circuits (ASICs), field programmable gate arrays (FPGAs), or the like.

The memory 356 may include a random access memory (RAM) or another type of dynamic storage device that stores information and instructions for execution by the processor 354. The memory 356 may also include a read-only memory (ROM) or another type of static storage device that stores static information and instructions for the processor 354. The memory 356 may further include other types of magnetic or optical recording medium and its corresponding drive for storing information and/or instructions.

The communication interface 358 may include any transceiver-like device and antenna that enables the network node 350 to communicate via radio frequency with other devices and/or systems. The communication interface 358 may further include interfaces, ports, or connectors to other devices.

The input 360 may include one or more devices that permit an operator to enter information to the network node 350, such as a keyboard, a keypad, a mouse, a pen, a touch-sensitive pad or screen, a microphone, one or more biometric mechanisms, and the like. The output 362 may include one or more devices that outputs information to the operator, such as a display, a printer port, a speaker, etc.

As described herein, the network node 350 such as the PGW 50 may perform certain operations in response to the processor 354 executing software instructions contained in a computer-readable medium, such as memory 356. A computer-readable medium may be defined as a physical or logical memory device. A logical memory device may include memory space within a single physical memory device or spread across multiple physical memory devices. The software instructions may be read into memory 356 from another computer-readable medium or from another device via a communication interface 358. The software instructions contained in the memory 356 may cause processor 354 to perform processes described herein. Alternatively, hardwired circuitry may be used in place of or in combination with software instructions to implement processes described herein. Thus, implementations described herein are not limited to any specific combination of hardware circuitry and software.

The features of the present invention which are believed to be novel are set forth below with particularity in the appended claims. However, modifications, variations, and changes to the exemplary embodiments described above will be apparent to those skilled in the art, and the system and method described herein thus encompasses such modifications, variations, and changes and are not limited to the specific embodiments described herein.

What is claimed is:

1. A Packet Data Network Gateway (PGW) network node of an Evolved Packet Core (EPC) for interfacing with an IP Multimedia Core Network Subsystem (IMS), comprising:
   an Internet Protocol (IP) address assignment functionality module configured to allocate on a per Package Data Network (PDN) basis, to a User Equipment (UE) requesting an Internet Protocol version 6 (IPv6) address, both of (a) an Internet Protocol version 4 (IPv4) address from an IPv4 address pool, and (b) the IPv6 address from an IPv6 address pool;
   a Network Address Translation-Application Layer Gateway (NAT64-ALG) functionality module configured to translate between IPv4 and IPv6 addresses;

a Gx interface from the PGW toward a Policy Control and Charging Rules Function (PCRF) network node configured to transmit the UE's IPv4 address to the PCRF;

an SGi interface toward an application node of the IMS configured to transmit the UE's IPv4 address to the application node, and to transmit and receive IP media packets between the IMS and the UE after IPv4 and IPv6 address translation; and one or more of an S2b interface toward an Evolved Packet Data Gateway (ePDG) network node, an S5/S8 interface toward a Serving Gateway (SGW) network node, and an Gn/Gp interface toward a Serving GPRS Support Node (SGSN) network node, the PWG receiving a Protocol Configurations Option (PCO) message comprising an IP version of the UE from the UE.

2. The PGW network node of claim 1, wherein the Gx interface is further configured to provision Policy and Charging Control (PCC) rules and Service Data Flow (SDF) filters from the PCRF to the PGW.

3. The PGW network node of claim 2, where the NAT64-ALG functionality module and the PGW are further configured to translate between IPv4 and IPv6 SDF filters.

4. The PGW network node of claim 1, further comprising a NAT64 Network Address and Port Translation (NAPT) table.

5. The PGW network node of claim 1, wherein the PGW node comprises the S2b interface toward an Evolved Packet Data Gateway (ePDG) network node.

6. The PGW network node of claim 1, wherein the PGW node comprises the S5/S8 interface toward a Serving Gateway (SGW) network node.

7. The PGW network node of claim 1, wherein the PGW node comprises the Gn/Gp interface toward a Serving GPRS Support Node (SGSN) network node.

8. The PGW network node of claim 1, wherein the application node of the IMS comprises an Application Function (AF).

9. A Packet Data Network Gateway (PGW) network node of an Evolved Packet Core (EPC) for connecting a User Equipment (UE) with an IP Multimedia Core Network Subsystem (IMS), comprising:

a Gx interface toward a Policy Control and Charging Rules Function (PCRF) network node configured to transmit an Internet Protocol version 4 (IPv4) address, allocated to the UE by the PGW, to the PCRF;

an SGi interface toward an application node of the IMS configured to transmit the IPv4 address to the application node, and to transmit and receive IP media packets between the IMS and the UE after IPv4 and Internet Protocol version 6 (IPv6) address translation by the PGW; and a processor including:
an Internet Protocol (IP) address assignment function configured to allocate on a per Package Data Network (PDN) basis, to the UE requesting an IPv6 address, both of (a) the IPv4 address from an IPv4 address pool, and (b) the IPv6 address from an IPv6 address pool;

a Network Address Translation-Application Layer Gateway (NAT64-ALG) function configured to translate between IPv4 and IPv6 addresses of the UE; and one or more of an S2b interface toward an Evolved Packet Data Gateway (ePDG) network node, an S5/S8 interface toward a Serving Gateway (SGW) network node, and an Gn/Gp interface toward a Serving GPRS Support Node (SGSN) network node, wherein the PGW sets up a dedicated tunnel between an Evolved Packet Data Gateway (ePDG) network node and the PGW.

10. The PGW network node of claim 9, wherein the Gx interface is further configured to provision Policy and Charging Control (PCC) rules and Service Data Flow (SDF) filters from the PCRF to the PGW.

11. The PGW network node of claim 10, where the NAT64-ALG function is further configured to translate between IPv4 and IPv6 SDF filters.

12. The PGW network node of claim 9, further comprising a NAT64 Network Address and Port Translation (NAPT) table.

13. The PGW network node of claim 9, further comprising an S2b interface toward the ePDG network node.

14. A computer-implemented method in a Packet Data Network Gateway (PGW) of an Evolved Packet Core (EPC) for interfacing with an IP Multimedia Core Network Subsystem (IMS), comprising:

allocating, on a per Package Data Network (PDN) basis, to a User Equipment (UE) requesting an IPv6 address, both of (a) an Internet Protocol version 4 (IPv4) address from an IPv4 address pool, and (b) the IPv6 address from an IPv6 address pool;

providing IPv4 and IPv6 address and Service Data Flow (SDF) filter translation;

providing a Gx interface toward a Policy Control and Charging Rules Function (PCRF) network node configured to transmit the UE's IPv4 address to the PCRF;

providing an SGi interface toward an application node of the IMS, providing the UE's IPv4 address to the application node over the SGi interface, and transmitting and receiving IP media packets between the IMS and the UE after IPv4 and IPv6 address translation;

providing one or more of an S2b interface toward an Evolved Packet Data Gateway (ePDG) network node, an S5/S8 interface toward a Serving Gateway (SGW) network node, and an Gn/Gp interface toward a Serving GPRS Support Node (SGSN) network node; and receiving a Protocol Configurations Option (PCO) message comprising an IP version of the UE from the UE.

15. The computer-implemented method of claim 14, wherein providing the Gx interface further comprises provisioning Policy and Charging Control (PCC) rules and Service Data Flow (SD F) filters from the PCRF.

16. The computer-implemented method of claim 14, further comprising accessing a NAT64 Network Address and Port Translation (NAPT) table for translating the IPv4 and IPv6 addresses.

17. The computer-implemented method of claim 14, further comprising providing an S2b interface toward an Evolved Packet Data Gateway (ePDG) network node.

18. The computer-implemented method of claim 14, further comprising providing an S5/S8 interface toward a Serving Gateway (SGW) network node.

19. The computer-implemented method of claim 14, further comprising providing an Gn/Gp interface toward a Serving GPRS Support Node (SGSN) network node.

* * * * *